United States Patent
Olausson

Patent Number: 6,138,969
Date of Patent: *Oct. 31, 2000

[54] BRACKET MOUNTABLE IN AN UNOCCUPIED SWITCH SOCKET IN A VEHICLE DASHBOARD FOR HOLDING EQUIPMENT SUCH AS A TELEPHONE

[75] Inventor: Jan-Olof Olausson, Hönö, Sweden

[73] Assignee: AB Volvo, Göteborg, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/693,300
[22] PCT Filed: Mar. 27, 1995
[86] PCT No.: PCT/SE95/00321
§ 371 Date: Aug. 16, 1996
§ 102(e) Date: Aug. 16, 1996
[87] PCT Pub. No.: WO95/26891
PCT Pub. Date: Oct. 12, 1995

[30] Foreign Application Priority Data
Mar. 31, 1994 [SE] Sweden ................... 9401110

[51] Int. Cl.⁷ .................. B60R 7/06; G12B 9/08
[52] U.S. Cl. ............... 248/222.52; 248/220.21; 248/221.11; 248/27.1; 379/454; 224/483
[58] Field of Search ............. 248/222.52, 220.21, 248/221.11, 27.1, 231.61, 231.41; 403/22, 388; 379/446, 455, 454, 426; 224/483

[56] References Cited

U.S. PATENT DOCUMENTS

| | | | |
|---|---|---|---|
| 1,065,933 | 7/1913 | Fowler | 403/388 X |
| 1,247,389 | 11/1917 | Futterman | 248/220.21 |
| 2,099,116 | 11/1937 | Kalmbach | 248/222.52 X |
| 2,944,642 | 7/1960 | Evans | 403/22 |
| 3,689,013 | 9/1972 | Neugebauer | 248/27.1 |
| 4,413,798 | 11/1983 | Tamura et al. | 248/27.1 |
| 4,513,555 | 4/1985 | Johnson | 52/657 |
| 4,518,138 | 5/1985 | Stutenkemper et al. | 248/220.21 X |
| 4,724,986 | 2/1988 | Kahn | 224/544 |
| 4,877,164 | 10/1989 | Baucom | 224/544 |
| 4,895,326 | 1/1990 | Nimpoeno et al. | 248/27.1 |
| 5,020,748 | 6/1991 | Okajima | 248/27.1 |
| 5,086,958 | 2/1992 | Nagy | 224/544 |
| 5,104,071 | 4/1992 | Kowalski | 248/27.1 |
| 5,193,768 | 3/1993 | Mita | 248/27.1 |
| 5,202,913 | 4/1993 | Lang et al. | 455/550 |
| 5,228,652 | 7/1993 | Ponticelli et al. | 248/27.1 |
| 5,259,655 | 11/1993 | Anderson | 248/27.1 X |
| 5,467,947 | 11/1995 | Quilling | 248/27.1 |
| 5,544,865 | 8/1996 | Abbaticchio | 403/22 X |
| 5,593,124 | 1/1997 | Wang | 248/231.81 |
| 5,651,523 | 7/1997 | Bridges | 248/311.2 |

FOREIGN PATENT DOCUMENTS

| | | | |
|---|---|---|---|
| 225517 | 1/1958 | Australia | 403/388 |
| 0 465 965 | 1/1992 | European Pat. Off. | |
| 462 646 | 8/1990 | Sweden | |

*Primary Examiner*—Daniel P. Stodola
*Assistant Examiner*—Gregory J. Strimbu
*Attorney, Agent, or Firm*—Royston, Rayzor, Vickery, Novak & Druce, L.L.P.

[57] ABSTRACT

A bracket for installation of equipment on the dashboard of a vehicle includes at least one attachment member, a flat part for holding the equipment and a support member. The attachment member is located at one end of the bracket and the support member is located at another end of the bracket at a distance spaced from the attachment member. In its installed position, the support member rests against the dashboard with a certain preload. The attachment member includes a U-shaped clamp which is designed to be installed into an unoccupied switch socket in the dashboard.

13 Claims, 2 Drawing Sheets

BRACKET MOUNTABLE IN AN UNOCCUPIED SWITCH SOCKET IN A VEHICLE DASHBOARD FOR HOLDING EQUIPMENT SUCH AS A TELEPHONE

TECHNICAL FIELD

The present invention refers to a bracket for installation of equipment at the dashboard of a vehicle, comprising at least one attachment member and a flat part for holding said equipment, which attachment is located at one end of the bracket, the bracket also comprises a support member located at a distance from the attachment member, wherein the bracket in its installed position rests against the instrument panel with a certain preload.

BACKGROUND OF THE INVENTION

Installation of mobile telephones and other additional equipment at the instrument panel of a motor vehicle, e.g. a passenger car, usually leads to a certain amount of damage upon the instrument panel. This may result in that the value of the vehicle is reduced at a coming selling of the vehicle. There is an obvious risk that the installation of said equipment affects the inner security of the vehicle, either when it is located too close to the driver or passenger of the vehicle, or by getting loose during an accident in which the vehicle is involved.

Also, the installation should not cause an increase in the noise level in the vehicle, e.g. due to vibration which cause rattling and creaking.

For example, SE-B-462646 describes a mounting bracket for mobile telephones, which bracket is produced of a plastic material with two tongues which are supposed to grip into slits in the instrument panel. Because this prior art mounting is provided with folding indents, it can easily be deformed at a collision and come loose. This prior art mounting displays several drawbacks, even if it does not necessitate damaging modifications to the instrument panel for installation. For example, the attachment to the instrument panel will not be so secure, that vibration related noise can be avoided. Besides, the installation position can be varied, which may result in that the position will be disadvantageous. Also, such disadvantageous positioning may lead to damages to cables connected to said additional equipment.

THE TECHNICAL PROBLEM

One object of the present invention is therefore to provide a bracket according to the above, which is simple to install in a stable manner, at a predetermined position at the instrument panel, without causing any marks or damages on said panel.

THE SOLUTION

For this purpose, the apparatus according to the invention is characterized in that the attachment member is provided with attachment means for installation into an unoccupied switch socket in the instrument panel.

Preferable variants of the invention are presented in the depending claims.

DESCRIPTION OF THE DRAWINGS

The invention will be described here below with reference to an embodiment shown in the accompanying drawings, in which.

DESCRIPTION OF EMBODIMENTS

Figure 2:
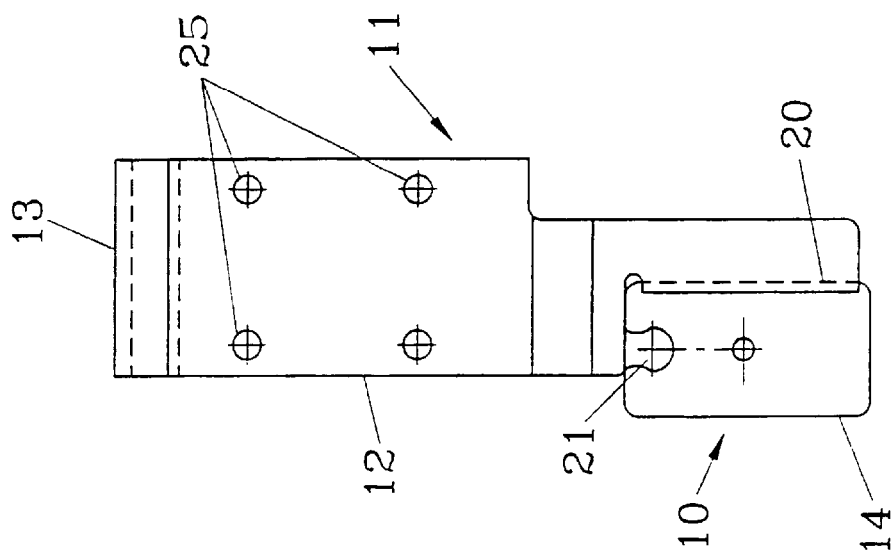
FIG. 2 shows the bracket according to FIG. 1 in a plane view.
Figure 1:
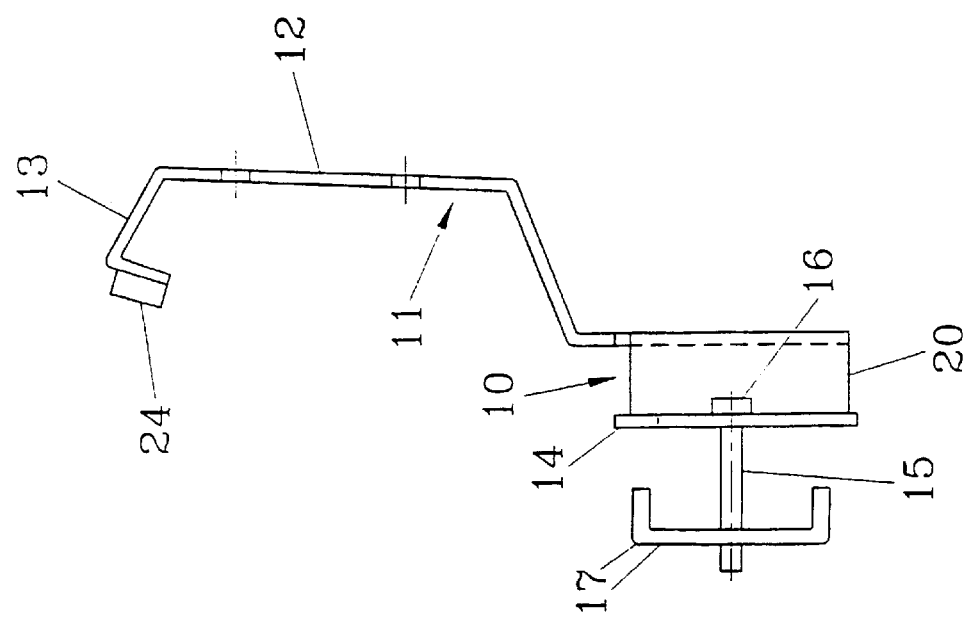
FIG. 1 shows a bracket according to the invention in a side view.

The bracket shown in the figures can for example be produced by bending a piece of sheet metal which is cut in its flat state. The cutting of such sheet metal pieces may for example be made at a low cost by means of a laser beam. The sheet metal piece is bent into the shape shown in FIGS. 1 and 2. According to an alternative, not shown embodiment, the bracket may be produced by injection moulding of plastic or aluminium.

Before bending the sheet metal piece is L-shaped, wherein a short limb 10 of the sheet metal piece is formed into an attachment member, and a longer limb is formed into a U with a flat part 12 and a support member 13.

Figure 3:
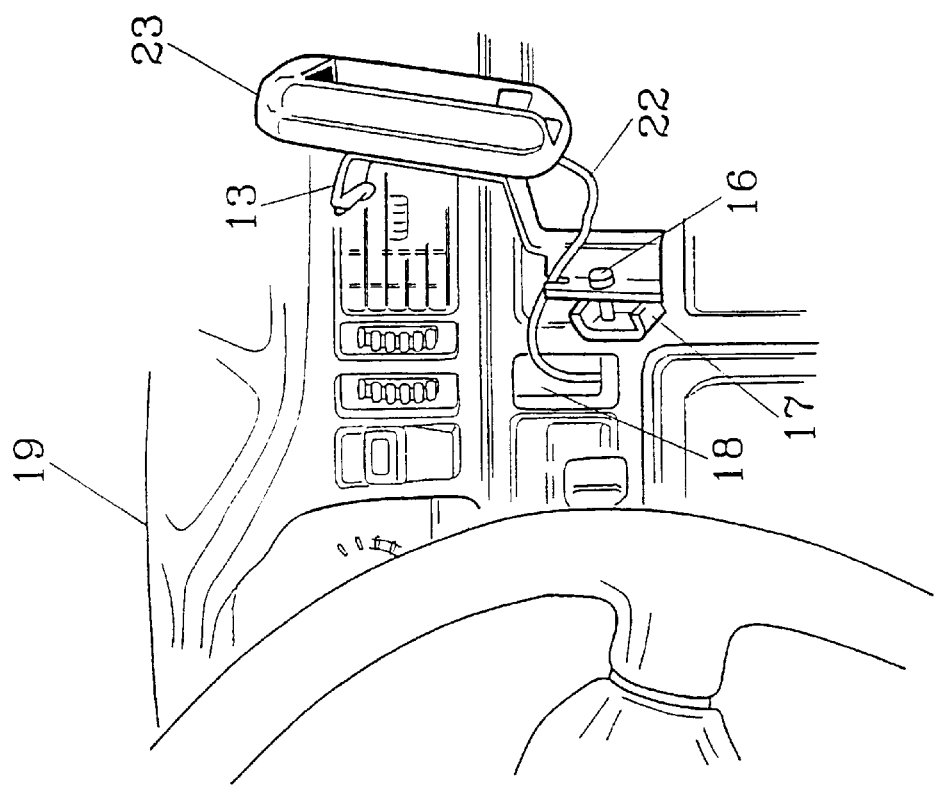
FIG. 3 shows the bracket according to FIGS. 1 and 2 during installation at the instrument panel of a vehicle.
Figure 4:
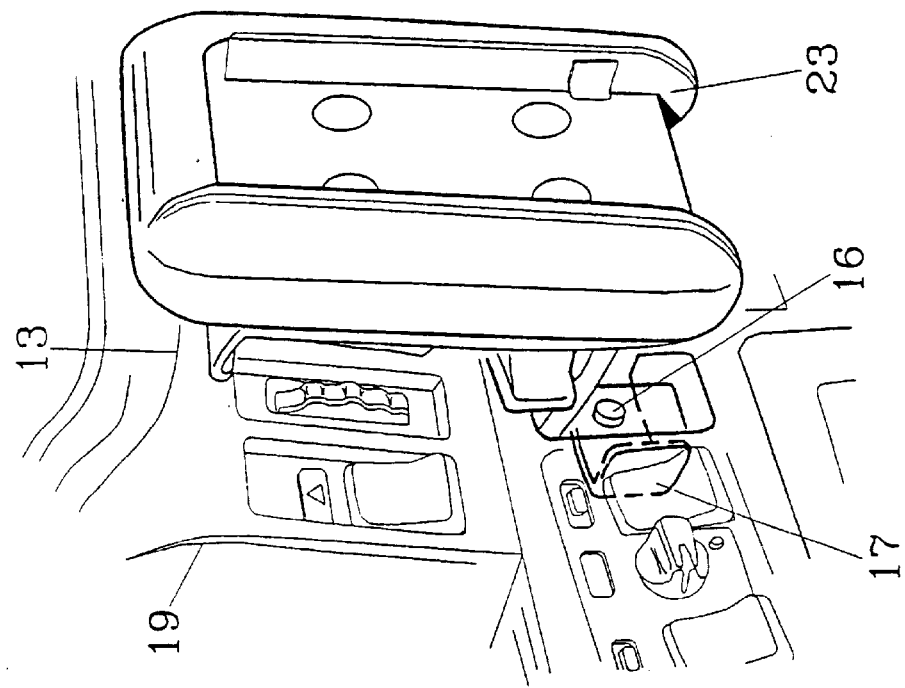
FIG. 4 shows the bracket in FIG. 3 after installation.

The attachment member comprises a rectangular part 14 which is provided with hole for a bolt 15 which is rotatable arranged in the hole and has a bolt head 16. The screw thread is in engagement with a corresponding screw thread in a U-shaped clamp 17. The rectangular part 14 is insertable with the clamp 17 into an opening 18 in the instrument panel 19 shown in FIGS. 3 and 4.

Preferably, the opening 18 is composed by an unoccupied switch socket in the instrument panel. By turning the clamp 17 an angle of 90° by means of the bolt head 16 and then tightening the screw, it is possible to move the clamp with respect to the rectangular part 14, which results in that the attachment member is secured in the opening 18. Because the opening 18 has a certain depth, the part 14 protruding from the angle member 20 will have a stable support against the side wall of the opening.

The rectangular part 14 is provided with an opening 21 which forms a passage for a cable 22 which leads to a microphone holder 23 which belongs to a mobile telephone.

The support member 13 is provided with a compressible element 24, e.g. of cellular rubber. The bracket has been bent to a shape resulting in that during installation it will be pretensioned with the support member 13 against the instrument panel 19. The cellular rubber element 24 enables a comparatively rigid pretensioning against the instrument panel, without deformation of said panel. The installation method ensures an attachment which is free from vibration and noise.

The flat part 12 is provided with four screw holes 25 for mounting the microphone holder 23.

The invention is not limited to the above described embodiment, but several variants are possible within the frame of the accompanying claims. For example, the bracket may be produced in other ways than described, e.g. by injection moulding of plastic or aluminium. The bracket according to the invention can be used for other purposes than for installation of a mobile telephone, e.g. a traffic information display. Further, the support member 13 may be located at any suitable location on the bracket, as long as the support member is at a distance from the attachment member.

What is claimed is:

1. A bracket for installation in a free switch socket on a vehicle dashboard, said bracket having a first end and a second end, the first end of the bracket having a flat surface and being provided with at least one attachment member, a support member arranged at the second end at a distance spaced apart from the attachment member, and an angular holder part having a first section and a second section, said first section being connected to the attachment member and said second section forming a flat holder portion attached to the support member and being substantially parallel to said flat surface of said first end, the support member having first and second surfaces and being angled back towards the attachment member with at least a portion of the first surface of the support member facing towards the holder part, the attachment member including a U-shaped clamp for installation into the free switch socket on the vehicle dashboard, said support member being adapted to rest against the vehicle dashboard with a preload when the bracket is installed on the vehicle dashboard with the U-shaped clamp installed in the free switch socket, said U-shaped clamp being provided with a hole that threadably receives a bolt provided at the first end of the bracket, said U-shaped clamp being rotatable with respect to the support member between a first position in which said U-shaped clamp is insertable into the free switch socket and a second position in which the U-shaped clamp is clamped in position in the free switch socket upon tightening the bolt.

2. The bracket of claim 1, including a compressible element mounted on the second surface of the support member.

3. The bracket of claim 1, wherein the flat holder portion is configured to receive and hold equipment.

4. The bracket of claim 1, wherein the attachment member includes a rectangular part at the first end of the bracket provided with a hole that receives the bolt.

5. The bracket of claim 1, wherein the flat holder portion includes a plurality of holes for mounting equipment.

6. A bracket for installation in a free switch socket on a vehicle dashboard, said bracket being comprised of a piece of sheet metal having a first end and a second end, the piece of sheet metal comprising at least one attachment member arranged at said first end, a support member arranged at the second end at a distance spaced apart from the attachment member, and a holder part located between the attachment member and the support member, the holder part including a first portion and a flat second portion, the flat second portion of the holder part being connected to and angularly disposed with respect to the first portion of the holder part, the support member being connected to an end of the flat second portion of the holder part and the attachment member being connected to an end of the first portion of the holder part, said bracket further comprising a compressible element mounted on a surface of the support member which faces away from the flat second portion of the holder part, the compressible element being adapted to be pressed against the vehicle dashboard and compressed when the bracket is installed on the vehicle dashboard, the attachment member including a U-shaped clamp for installation into the free switch socket of the vehicle dashboard so that when the bracket is installed on the vehicle dashboard with the U-shaped clamp installed in the free switch socket the support member is adapted to rest against the vehicle dashboard with a preload, said U-shaped clamp being provided with a hole that threadably receives a bolt provided at the first end of the bracket, said U-shaped clamp being rotatable with respect to the support member between a first position in which said U-shaped clamp is insertable into the free switch socket and a second position in which the U-shaped clamp is clamped in position in the free switch socket upon tightening the bolt.

7. The bracket of claim 6, wherein the attachment member includes a rectangular part at the first end of the bracket provided with a hole that receives the bolt.

8. The bracket of claim 6, wherein the flat second portion includes a plurality of holes for mounting equipment.

9. An equipment mounting bracket for installation in a free switch socket on a vehicle dashboard, said bracket comprising a holder part that includes a first portion having first and second ends and a flat second portion having first and second ends, the first end of the flat second portion of the holder part being connected to the first end of the first portion of the holder part, the flat second portion of the holder part being angularly disposed with respect to the first portion of the holder part, at least one attachment member arranged at said second end of said first portion of the holder part, a support member arranged at the second end of the flat second portion of the holder part at a distance from the attachment member, the support member including first and second surfaces, the support member being angularly disposed with respect to the flat second portion of the holder part and being angled back towards the attachment member so that at least a portion of the first surface faces towards the flat second portion of the holder part, the flat second portion of the holder part including means for mounting a piece of equipment on the flat second portion of the holder part, the attachment member including a U-shaped clamp for installation into the free switch socket so that when the bracket is installed on the vehicle dashboard with the U-shaped clamp installed in the free switch socket, the support member is adapted to rest against the vehicle dashboard with a preload, said U-shaped clamp being provided with a hole that threadably receives a bolt connected to the attachment member, said U-shaped clamp being rotatable with respect to the support member between a first position in which said U-shaped clamp is insertable into the free switch socket and a second position in which the U-shaped clamp is clamped in position in the free switch socket upon tightening the bolt.

10. The bracket of claim 9, including a compressible element mounted on the second surface of the support member.

11. The bracket of claim 9, wherein the attachment member includes a rectangular part provided with a hole that receives the bolt.

12. A bracket installed in a free switch socket on dashboard of a vehicle, said bracket having a first end and a second end, the first end of the bracket being provided with at least one attachment member installed in the free switch socket on the vehicle dashboard to mount the bracket with respect to the vehicle dashboard, said bracket including a holder part for holding equipment, and said bracket including a support member arranged at a distance spaced apart from the attachment member, said support member resting with a preload against an inwardly facing surface of the vehicle dashboard that faces inwardly towards an interior compartment of the vehicle, said attachment member comprising a U-shaped clamp provided with a hole that threadably receives a bolt, said bolt connecting the U-shaped clamp to the first end of the bracket, said U-shaped clamp being rotatable with respect to the support member between a first position in which said U-shaped clamp is insertable into the free switch socket and a second position in which the U-shaped clamp is clamped in position in the free switch socket upon tightening the bolt.

13. The bracket of claim 12, including a compressible element mounted on the support member and positioned between the inwardly facing surface of the vehicle dashboard and the support member.

* * * * *